US011329982B2

(12) United States Patent
Obaidi et al.

(10) Patent No.: US 11,329,982 B2
(45) Date of Patent: May 10, 2022

(54) MANAGING INTERNET OF THINGS DEVICES USING BLOCKCHAIN OPERATIONS (71) Applicant: T-Mobile USA, Inc., Bellevue, WA (US)

(72) Inventors: Ahmad Arash Obaidi, Issaquah, WA (US); Christopher Spanton, Seattle, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 762 days.

(21) Appl. No.: 16/237,638

(22) Filed: Dec. 31, 2018

(65) Prior Publication Data
US 2020/0213305 A1 Jul. 2, 2020

(51) Int. Cl.
*H04L 29/06* (2006.01)
*H04L 12/28* (2006.01)
*H04L 9/32* (2006.01)
*H04L 9/06* (2006.01)

(52) U.S. Cl.
CPC ........ *H04L 63/0876* (2013.01); *H04L 9/0637* (2013.01); *H04L 9/3297* (2013.01); *H04L 12/283* (2013.01); *H04L 12/2814* (2013.01); *H04L 63/0807* (2013.01); *H04L 63/10* (2013.01)

(58) Field of Classification Search
CPC . H04L 63/0876; H04L 9/0637; H04L 9/3297; H04L 12/2814; H04L 12/283; H04L 63/0807; H04L 63/10
See application file for complete search history.

(56) References Cited

U.S. PATENT DOCUMENTS

| 8,918,645 | B2* | 12/2014 | Evans .............. H04N 21/25435 |
| | | | 713/170 |
| 9,516,053 | B1 | 12/2016 | Muddu et al. |
| 9,985,984 | B1 | 5/2018 | Chavez et al. |
| 10,310,505 | B1 | 6/2019 | Hanson et al. |
| 10,805,068 | B1 | 10/2020 | Leise et al. |
| 11,039,317 | B2 | 6/2021 | Obaidi |

(Continued)

FOREIGN PATENT DOCUMENTS

| CN | 107508859 A | 12/2017 |
| WO | 2018014123 A1 | 1/2018 |

(Continued)

OTHER PUBLICATIONS

International Searching Authority, International Search Report and Written Opinion, PCT Patent Application PCT/US2019/068429, dated May 1, 2020, 11 pages.

(Continued)

*Primary Examiner* — Malcolm Cribbs
(74) *Attorney, Agent, or Firm* — Perkins Coie LLP (57) ABSTRACT

Systems and methods are described herein for provisioning a home automation hub, or one or more of IoT devices, with blockchain nodes (or sub-nodes). The hub, an IoT device, and/or a group of IoT devices can perform operations similar to a node on a blockchain network. The operations can include blockchain transactions and other operations, such as transactions performed to verify or confirm an IoT device is authorized to be part of the shared network and thus is authorized to connect to the hub.

20 Claims, 7 Drawing Sheets

(56) References Cited

U.S. PATENT DOCUMENTS

| | | |
|---|---|---|
| 11,159,945 B2 | 10/2021 | Obaidi |
| 2006/0230289 A1 | 10/2006 | Fox et al. |
| 2007/0291945 A1 | 12/2007 | Chuang et al. |
| 2015/0135283 A1 | 5/2015 | Tofighbakhsh |
| 2016/0283920 A1 | 9/2016 | Fisher et al. |
| 2017/0353496 A1 | 12/2017 | Pai et al. |
| 2017/0364698 A1 | 12/2017 | Goldfarb et al. |
| 2018/0091596 A1 | 3/2018 | Alvarez et al. |
| 2018/0219893 A1 | 8/2018 | Li et al. |
| 2018/0225693 A1 | 8/2018 | Postrel |
| 2018/0248896 A1 | 8/2018 | Challita et al. |
| 2018/0287780 A1 | 10/2018 | Safford et al. |
| 2018/0293557 A1 | 10/2018 | Kim et al. |
| 2018/0342036 A1 | 11/2018 | Zachary |
| 2018/0365397 A1 | 12/2018 | Viscarola et al. |
| 2018/0372502 A1 | 12/2018 | Rønnow et al. |
| 2019/0058697 A1* | 2/2019 | Chang .............. H04L 9/3247 |
| 2019/0093215 A1 | 3/2019 | Kang et al. |
| 2019/0104196 A1* | 4/2019 | Li .................... H04L 9/3239 |
| 2019/0182284 A1 | 6/2019 | Signorini et al. |
| 2019/0199756 A1 | 6/2019 | Correnti et al. |
| 2019/0215159 A1 | 7/2019 | Notani |
| 2019/0268284 A1 | 8/2019 | Karame et al. |
| 2019/0303942 A1 | 10/2019 | Balaraman et al. |
| 2019/0340269 A1 | 11/2019 | Biernat et al. |
| 2019/0361917 A1 | 11/2019 | Tran et al. |
| 2019/0373472 A1* | 12/2019 | Smith ................ H04L 9/3239 |
| 2019/0380037 A1 | 12/2019 | Lifshitz et al. |
| 2019/0392536 A1 | 12/2019 | Rice |
| 2020/0004854 A1 | 1/2020 | Inturi et al. |
| 2020/0014720 A1 | 1/2020 | Giura |
| 2020/0020038 A1 | 1/2020 | Haile et al. |
| 2020/0042012 A1 | 2/2020 | Zander |
| 2020/0045119 A1 | 2/2020 | Weldemariam et al. |
| 2020/0099531 A1 | 3/2020 | Chidambaram et al. |
| 2020/0099698 A1 | 3/2020 | Kundu et al. |
| 2020/0112432 A1 | 4/2020 | Iwama et al. |
| 2020/0117690 A1 | 4/2020 | Tran et al. |
| 2020/0118131 A1* | 4/2020 | Diriye ............... G06Q 20/4016 |
| 2020/0145234 A1 | 5/2020 | Nishijima |
| 2020/0160330 A1 | 5/2020 | Yan |
| 2020/0186527 A1 | 6/2020 | Delson et al. |
| 2020/0213826 A1 | 7/2020 | Obaidi |
| 2020/0213852 A1 | 7/2020 | Obaidi |
| 2020/0213857 A1 | 7/2020 | Obaidi |
| 2020/0389294 A1 | 12/2020 | Soundararajan et al. |
| 2021/0037013 A1 | 2/2021 | Salkintzis |
| 2021/0049477 A1 | 2/2021 | Sakae et al. |

FOREIGN PATENT DOCUMENTS

| | | |
|---|---|---|
| WO | 2018033309 A1 | 2/2018 |
| WO | 2018126029 A2 | 7/2018 |

OTHER PUBLICATIONS

International Searching Authority, International Search Report and Written Opinion, PCT Patent Application PCT/US2019/068433, dated Apr. 29, 2020, 9 pages.

\* cited by examiner

MANAGING INTERNET OF THINGS DEVICES USING BLOCKCHAIN OPERATIONS

CROSS-REFERENCE TO RELATED APPLICATIONS

This application is related to U.S. patent application Ser. No. 16/237,634, filed on Dec. 31, 2018, entitled USING A BLOCKCHAIN TO DETERMINE TRUSTWORTHINESS OF MESSAGES BETWEEN VEHICLES OVER A TELECOMMUNICATIONS NETWORK, U.S. patent application Ser. No. 16/237,626, filed on Dec. 31, 2018, entitled USING A BLOCKCHAIN TO DETERMINE TRUSTWORTHINESS OF MESSAGES WITHIN A TELECOMMUNICATIONS NETWORK FOR A SMART CITY, and U.S. patent application Ser. No. 16/237,607, filed on Dec. 31, 2018, entitled PROTECTING A TELECOMMUNICATIONS NETWORK USING NETWORK COMPONENTS AS BLOCKCHAIN NODES, all of which are hereby incorporated by reference in their entirety.

BACKGROUND

Various types of networks, including wireless networks, cellular networks, and other types of telecommunications networks, provide people across the world with communication services. For example, in most locations around the world, a user of a mobile device can access a network and communicate with other users or systems, either via voice calls, text messages, or data over the Internet. These networks, and their entrenched ubiquity, have connected users to many different users as well as to vast troves of information and services. Telecommunications networks, arguably, have made the world better for people.

However, such networks include various physical and virtual vulnerabilities, and a small minority of people will try and take advantage of these vulnerabilities to profit from fraudulent and other deceitful acts. Therefore, network providers will continue to improve the telecommunications networks, their components, and/or devices and systems that utilize the networks, with technology capable of preventing or deterring nefarious actors from attempting to exploit the network weaknesses.

BRIEF DESCRIPTION OF THE DRAWINGS

Embodiments of the present technology will be described and explained through the use of the accompanying drawings.

The drawings have not necessarily been drawn to scale. Similarly, some components or operations can be separated into different blocks or combined into a single block for discussion of some of the embodiments of the present technology. Moreover, while the technology is amenable to various modifications and alternative forms, specific embodiments have been shown by way of example in the drawings and are described in detail below. The intention, however, is not to limit the technology to the particular embodiments described. On the contrary, the technology is intended to cover all modifications, equivalents, and alternatives falling within the scope of the technology as defined by the appended claims.

DETAILED DESCRIPTION

Overview

Systems and methods are described herein for providing blockchain functionality to a telecommunications network, its components, and devices and systems that communicate over the telecommunications network. The systems and methods (collectively, "systems") can implement devices, systems, components, and so on with agents or other modules that transform or establish them as nodes (or sub-nodes) distributed across a network, such as nodes of a blockchain network.

For example, a network hub, or hub device (e.g. a home automation hub) manages and control operations of many different internet of things (IoT) devices that are associated with the hub over a network. The systems described herein can provision a hub, or one or more of the IoT devices, with blockchain nodes (or sub-nodes), enabling the hub, an IoT device, and/or a group of IoT devices to perform operations similar to a node on a blockchain network. The operations can include blockchain transactions and other operations, such as transactions performed to verify or confirm an IoT device is authorized to be part of the shared network, and thus is authorized to connect to the hub.

In some embodiments, the systems receive, at a home automation hub that provides a network to multiple internet of things (IoT) devices, a request from an unknown IoT device to connect to the home automation hub. The systems then perform, by the home automation hub, a blockchain operation to determine whether the IoT device is to be connected to the home automation hub, and determine, based on an outcome of the blockchain operation, whether to allow the request from the unknown IoT device to connect to the home automation hub.

For example, the systems can provision the hub with a copy of a blockchain tracking the transactions performed on behalf of a network, and blockchain agent that accesses a blockchain tracking transactions performed on behalf of the network provided to one or more IoT devices. The blockchain agent can receive requests from IoT devices to connect to the network and authorize the IoT devices to connect to the network upon comparing information provided in the received requests to information within the transactions of the blockchain.

Further, the systems can provision a hub or IoT device with a node to facilitate the provisioning of the IoT device in routing data via the local network or to other network locations (e.g. cloud storage or other networked sites). The nodes can include or manage smart contracts that utilize the blockchain, and, based on the smart contracts, initiate various data provisioning protocols when IoT devices are connected to or associated with the hub.

Thus, the systems utilize blockchain processes, by configuring a hub and/or associated IoT devices as nodes on a blockchain, in order to provide a network with improved and enhanced security and other management functionality, among other benefits.

In the following description, for the purposes of explanation, numerous specific details are set forth in order to provide a thorough understanding of embodiments of the present technology. It will be apparent, however, that embodiments of the present technology can be practiced without some of these specific details.

Examples of Telecommunication Networks as Blockchain Networks of Nodes

As described herein, in some embodiments, the systems manage devices, components, and systems of or associated with a telecommunications network as nodes on a blockchain network. Devices, therefore, functions as nodes (or sub-nodes) that are distributed across the blockchain network.

Nodes on a blockchain network perform various functions for the network. They process transactions and maintain copies (e.g., replicated databases or ledgers) of the blockchain. Thus, the distributed nodes combine to be the blockchain network. For example, with respect to cryptocurrencies (e.g., Bitcoin), the nodes check new currency transactions against a consensus protocol, which is a uniform system of agreement between all the nodes of the network when validating transactions processed by the nodes. Therefore, a node itself, relying on the consensus protocol, determines whether to validate transactions at the node.

There can be different types of nodes, such as full nodes, sub-nodes, and agents. Full nodes maintain a complete copy of every block (e.g., record) and transaction within the blockchain network, and validate the blocks/transactions against the consensus protocol. Sub-nodes and agents, however, can only validate their own transactions. In some cases, a group of sub-nodes or agents can act, together, as a node or full node. Further, nodes, sub-nodes, and agents can act as endpoint nodes (when communications between nodes in the network end or terminate) or as redistribution nodes (where communications are redistributed to other nodes of the network).

Telecommunication networks are well suited to managing communications between components (e.g., devices, cells, access points, registers, databases, gateways, and so on) by representing the components as nodes of blockchain networks. For example, any devices associated with the network, communicating via the network, and/or within or providing the network, can be nodes and function to validate transactions, authenticate other devices, perform actions or operations, or otherwise communicate over the network based on blockchain transactions.

Figure 1:
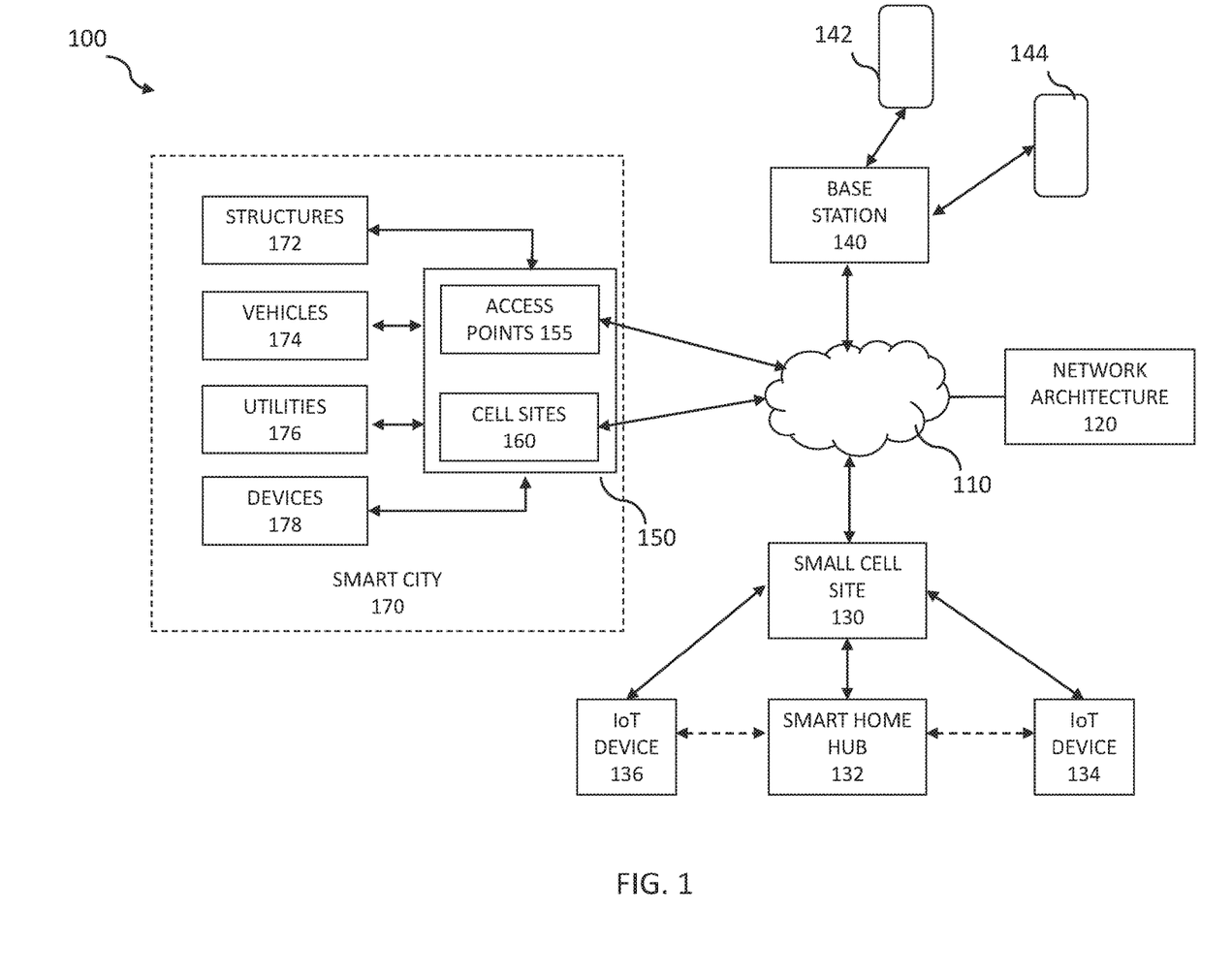
FIG. 1 is a block diagram illustrating a suitable network environment of devices and components representing nodes of a blockchain network.

FIG. 1 is a block diagram illustrating a suitable network environment 100 of devices and components representing nodes of a blockchain network. As depicted, a telecommunications network 110 can extend into virtually any area, location, structure, or environment, providing services to devices and systems of all scales—from mobile devices to smart homes and other single structures, to communities, cities, and other groups of structures or devices.

The telecommunications network is provided via a network architecture 120, such as the various components that provide communication services (e.g., voice calls, text and other messaging, data communications, and so on) to mobile devices and other user equipment. As described herein, the network architecture can include access points or networks, gateways, core networks components (e.g., operations components, packet control components, policy control functions, charging components, subscriber databases, and so on), and so on.

Devices, systems, and geographical areas can access the telecommunications network 110 through a variety of different sites, access points, and/or networks. For example, a small cell site (e.g., a femtocell, picocell, or other small cell) 130 can provide access to the network 110 to a small or targeted area, such as a smart home hub 132 and its various connected (internet of things, or IoT) devices 134, 136. The small cell site 130 can provide access to the smart home hub 132 and the devices 134, 136 directly (as well as any mobile devices), or the devices can access the network 110 via the smart home hub 132.

In addition to the small cell site 130, the devices, systems, and/or areas can access the network 110 via base stations or other cell sites, such as base station 140. For example, mobile devices 142, 144 can communicate over the network 110 by accessing the network 110 via the base station 140.

Further, devices, systems, and/or other areas, such as smart cities and their various components and infrastructure can access the network 110 via provisioned access networks 150, such as access networks 150 supported by access points 155 (e.g., wireless access points, hotspots, routers, and so on), or other cell sites 160 (e.g., small cells or base stations positioned to service specific areas or centers).

For example, a smart city 170 can include structures 172 (e.g., houses, buildings, schools, hospitals, and so on) that connect to the network 110 via the access network 150. Vehicles 174 can also access the network 110 vis the access network 150. Further, various utilities 176 and their systems or devices (e.g., electric grid components, water systems, gas or other fuel systems, wireless infrastructure systems, emergency response systems, and so on), can communicate over the network 110. Also, devices 178 (e.g., traffic lights and other devices, street lamps, parking meters, and so on), access the network 110 via the access network 150.

Some or all of these systems and devices 172, 174, 176, 178 can communicate with one another via the network 110. For example, vehicles 174 can communicate with other vehicles 174, or with certain devices 178 (e.g., traffic lights), or with services provided by utilities 176 (e.g., emergency response services), or with structures 172 (e.g., smart home devices) over the network 110. As another example, a utility (e.g., the electric grid) can communicate with other utilities (e.g., the emergency response system), with vehicles 174, and so on.

Thus, in some embodiments, the telecommunications network 110 (managed by the network architecture 120) provides communication services to a wide range of all the different devices and systems capable of communications— from single mobile devices 142, 144 to large-scale connected cities 170 of devices, systems, and structures. Further, although FIG. 1 depicts examples of how these device and systems access the network 110, other configurations are possible. For example, mobile device 142 can access the network 110 via small cell site 130, and IoT device 132 can access the network 110 via the base station 140, among other configurations.

As described herein, some or all of the devices or systems depicted in FIG. 1 or the other Figures can act as or be configured to function as a node or sub-node of a blockchain network. A node or sub-node can be implemented as a module, agent, or another component of a device or system. The agents or modules can be functional modules or engines that are implemented with a combination of software (e.g., executable instructions, or computer code) and hardware (e.g., at least a memory and processor). Accordingly, as used herein, in some examples a module or engine is a processor-implemented module or set of code and represents a computing device having a processor that is at least temporarily configured and/or programmed by executable instructions stored in memory to perform one or more of the particular functions that are described herein.

As nodes (or sub-nodes), the devices or systems function to maintain a distributed ledger (e.g., a blockchain) of transactions. Further, the devices or systems can collaboratively function to validate, verify, certify, or authenticate data and/or transactions communicated between the nodes. Thus, the devices or systems, working as nodes of a blockchain network, operate to provide security, reliability, and/or redundancy between themselves and various portions or segments of the telecommunications network 110.

The blockchain, being associated with the network and various devices or systems, can be configured to track or store information specific to communications over the network. For example, blockchain transactions can include information identifying a location of a user or device (e.g., GPS information, cell tower or base station information, access point information, and so on), device or user identifiers, such as Mobile Station International Subscriber Directory Number (MSISDN) or International Mobile Equipment Identity (IMEI) information, biometric information and other biological or physical user identifiers, and so on.

For example, a device can access a network and run an instance of an Ethereum virtual machine, and utilize various device or network-specific information when authenticating onto the network via various blockchain transactions. The blockchain, tracking and maintaining such information, can then authenticate the device via the information with a high degree of confidence, knowing that the actual device (or the person behind the device) is valid and authorized to access the network.

To that end, the devices or systems, as nodes, can perform specific functions when communicating with other devices or systems, depending on their role within the network 110 or how they are being utilized. For example, a mobile device (e.g., mobile device 142), can act as an endpoint node of a blockchain network, whereas a gateway component of the network architecture 120 can function as a redistribution node.

Figure 2A:
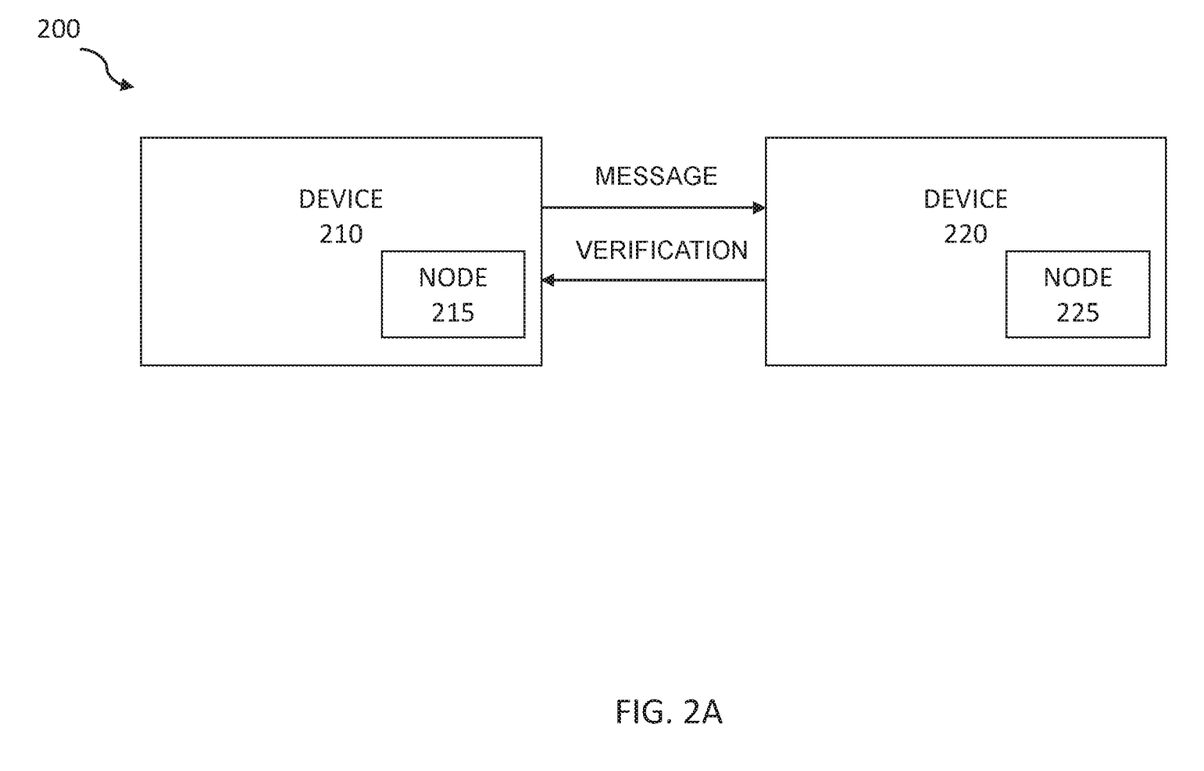
FIG. 2A is a block diagram illustrating communications between two separate devices represented as nodes of a blockchain network.
Figure 2B:
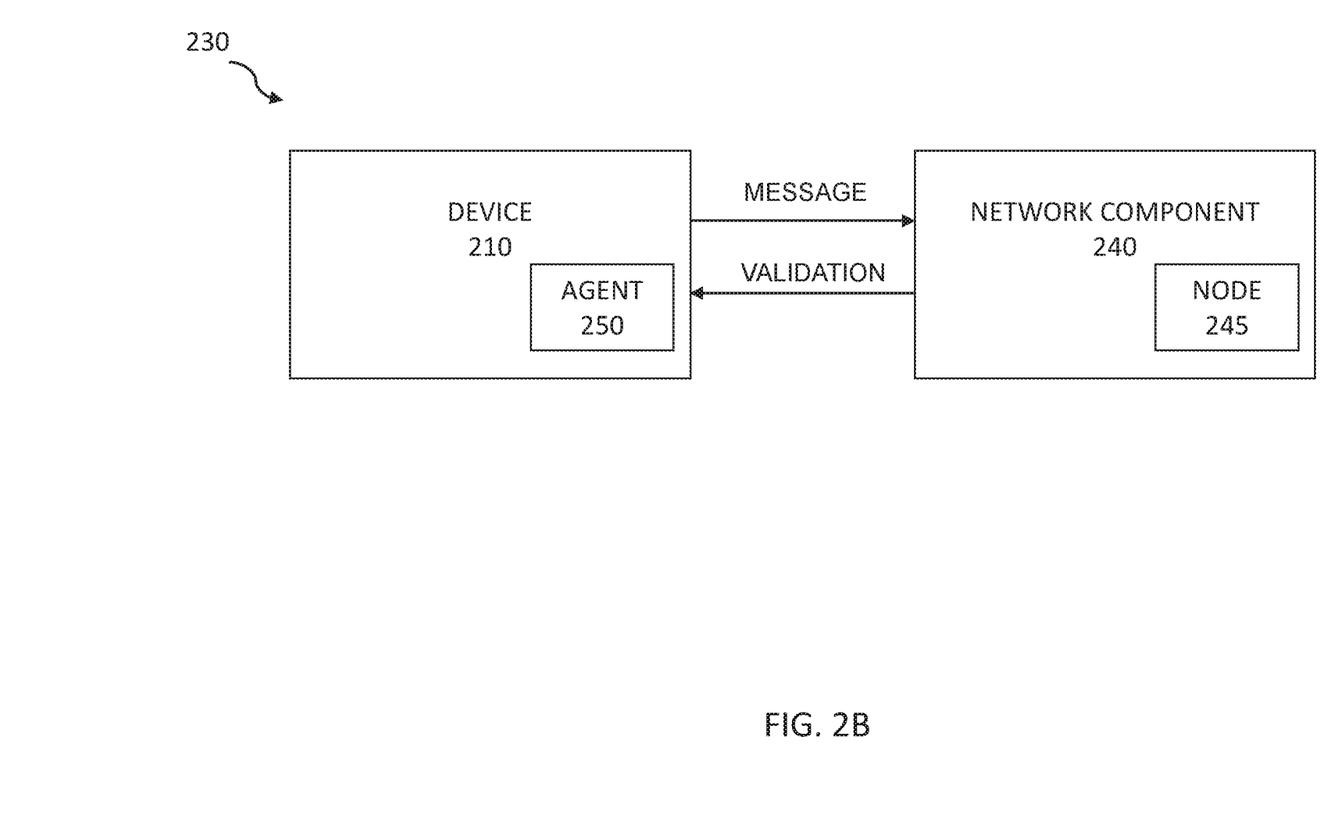
FIG. 2B is a block diagram illustrating communications between a device and a network component, where both are represented as nodes of a blockchain network.
Figure 2C:
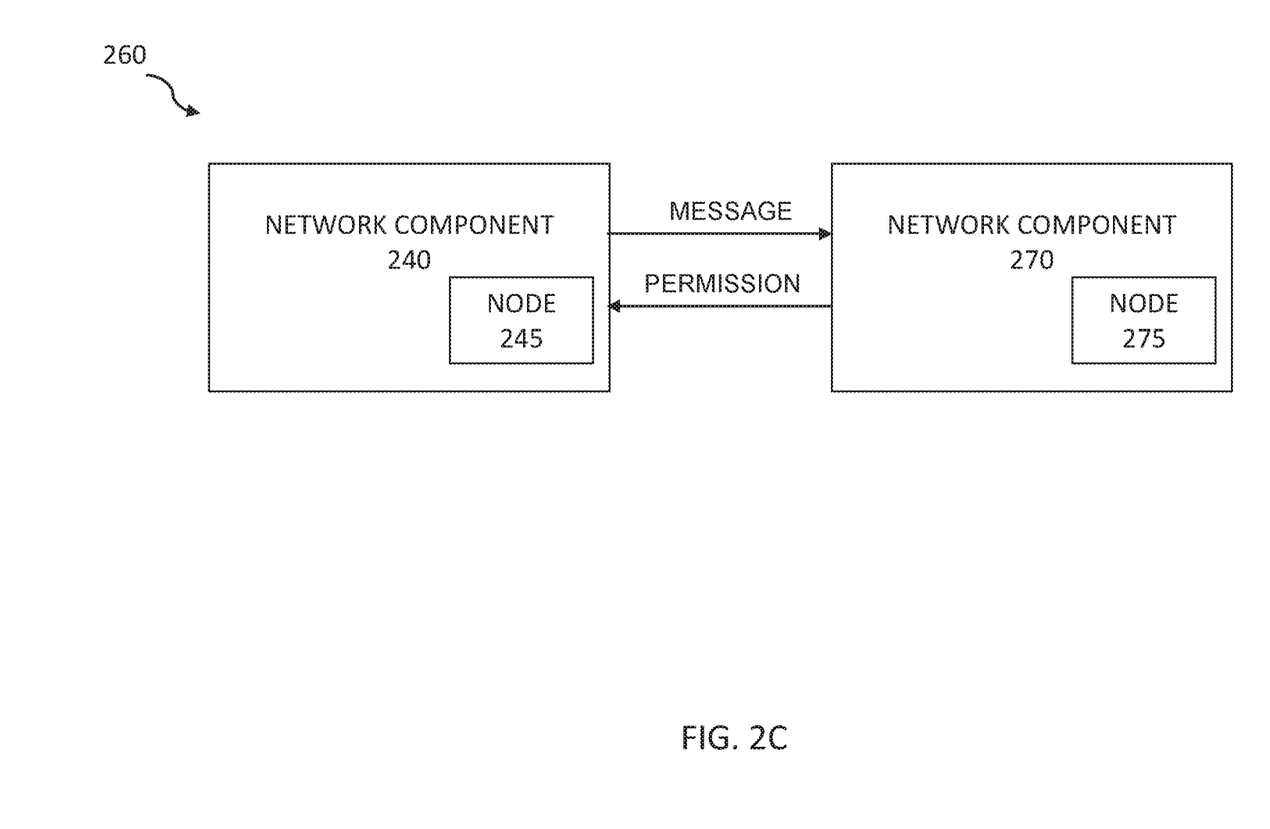
FIG. 2C is a block diagram illustrating communications between network components represented as nodes of a blockchain network.

Following the example, the mobile device, when communicating with other devices, can compare perform blockchain transactions to compare certificates of other devices in communication with the mobile device, whereas the gateway component can maintain a complete ledger of an entire network of blocks or transactions, and allow access to core network components when both requesting device and core network components are verified by the gateway component. FIGS. 2A-2C provide examples of such functionality for different devices, components, or systems.

FIG. 2A is a block diagram illustrating communications 200 between two separate devices represented as nodes of a blockchain network. For example, a device 210 can send a message to a device 220 over the network 110. The device can also send, via a node component 215 or similar agent associated with the device 210, a certificate or other identifier of the device. The device 220, via its node component or agent, can verify the device 210 based on the transmitted certificate.

For example, the device 220 can compare the credentials of the device 210 with one or more previous transactions performed by the device 210 on the network. When the credentials are associated with authenticated or acceptable transactions (or previous verifications), the device 220 verifies the device 210 to the network 110 (enabling the device 210 to utilize all or certain services provided by the network 210). Upon verification, the device 220 can transmit a verification message back to the device 210 (which can add the message to the blockchain via the node 215). Thus, in some embodiments, one device can verify and/or authenticate another device to the network 110 or other devices or systems associated with the network 110 by utilizing blockchain processes.

FIG. 2B is a block diagram illustrating communications 230 between a device and a network component, where both are represented as nodes of a blockchain network. For example, the device 210 can send a message to a network component 240 (e.g., a network component of architecture 120), such as when attempting to access the network 110 via one or more access points. The device 210, via its associated agent 250, transmits information to the network component 240, which compares the information, via its associated blockchain node 245, to records of the blockchain, in order to validate the device 210 to the network 110.

For example, such as process can occur every time the device 210 accesses the network 110, or in response to potential attempts to access the network 110 without permission or knowledge of the various network components 240. Once validated, the node 245 adds a transaction to the blockchain representing activity within the network 110, and the device 210 communicates over the network 110 as requested. Thus, in some embodiments, network components 240 can, at each or some of the components, perform validation processes for a device that attempts to access services provided by the network 210.

FIG. 2C is a block diagram illustrating communications 260 between network components represented as nodes of a blockchain network. At times, one network component 270 can perform various blockchain processes in order to permit another network component (e.g., component 240) to perform its intended functions for the network 110.

For example, the network component 240 can, via its agent 245, send a message to the network component 270 as part of a normal core network function or process. To avoid perpetuating messages from a compromised component, the network component 270 can, via its node 275, compare the message to the blockchain, and give permission for the network component 240 to continue to operate within the network 110. Thus, in some embodiments, the network components themselves can act as nodes of a blockchain in order to maintain the integrity and reliability of operation and processes of the telecommunications network 110.

Thus, in various embodiments, the telecommunications network 110 utilizes the functionality of a distributed ledger to provide various components, devices, or systems with the means to act as authentication, validation, or verification interfaces for the network 110. The following section illustrates details for specific embodiments employing such functionality.

FIG. 1 and the discussion herein provide a brief, general description of a suitable computing environment in which devices and network components function as nodes on a blockchain network can be supported and implemented. Although not required, aspects of the various components or systems are described in the general context of computer-executable instructions, such as routines executed by a general-purpose computer, e.g., mobile device, a server computer, or personal computer. The system can be practiced with other communications, data processing, or computer system configurations, including: Internet appliances, hand-held devices (including tablet computers and/or personal digital assistants (PDAs)), all manner of cellular or mobile phones, multi-processor systems, microprocessor-based or programmable consumer electronics, set-top boxes, network PCs, mini-computers, mainframe computers, and the like. Indeed, the terms "computer," "host," and "host computer," and "mobile device" and "handset" are generally used interchangeably herein, and refer to any of the above devices and systems, as well as any data processor.

Aspects of the system can be embodied in a special purpose computing device or data processor that is specifically programmed, configured, or constructed to perform one or more of the computer-executable instructions explained in detail herein. Aspects of the system can also be practiced in distributed computing environments where tasks or modules are performed by remote processing devices, which are linked through a communications network, such as a Local Area Network (LAN), Wide Area Network (WAN), or the Internet. In a distributed computing environment, program modules can be located in both local and remote memory storage devices.

Aspects of the system can be stored or distributed on computer-readable media (e.g., physical and/or tangible non-transitory computer-readable storage media), including magnetically or optically readable computer discs, hard-wired or preprogrammed chips (e.g., EEPROM semiconductor chips), nanotechnology memory, or other data storage media. Indeed, computer implemented instructions, data structures, screen displays, and other data under aspects of the system can be distributed over the Internet or over other networks (including wireless networks), on a propagated signal on a propagation medium (e.g., an electromagnetic wave(s), a sound wave, etc.) over a period of time, or they can be provided on any analog or digital network (packet switched, circuit switched, or another scheme). Portions of the system can reside on a server computer, while corresponding portions can reside on a client computer such as a mobile or portable device, and thus, while certain hardware platforms are described herein, aspects of the system are equally applicable to nodes on a network. In an alternative embodiment, the mobile device or portable device can represent the server portion, while the server can represent the client portion.

In some embodiments, the devices can include network communication components that enable the devices to communicate with remote servers or other portable electronic devices by transmitting and receiving wireless signals using a licensed, semi-licensed, or unlicensed spectrum over communications networks. In some cases, the telecommunication network can be comprised of multiple networks, even multiple heterogeneous networks, such as one or more border networks, voice networks, broadband networks, service provider networks, Internet Service Provider (ISP) networks, and/or Public Switched Telephone Networks (PSTNs), interconnected via gateways operable to facilitate communications between and among the various networks. The communications network can also include third-party communications networks such as a Global System for Mobile (GSM) mobile communications network, a code/time division multiple access (CDMA/TDMA) mobile communications network, a 3rd or 4th generation (3G/4G) mobile communications network (e.g., General Packet Radio Service (GPRS/EGPRS)), Enhanced Data rates for GSM Evolution (EDGE), Universal Mobile Telecommunications System (UMTS), or Long Term Evolution (LTE) network), 5G mobile communications network, IEEE 802.11 (WiFi), or other 3GPP or non-3GPP communications networks.

Examples of Manacling Internet of Things Devices Using Blockchain Operations

As described herein, in some embodiments, the systems provision a home automation hub (e.g., the smart home hub 132) as a node on a blockchain network, enabling the hub to securely and safely manage IoT devices (e.g., devices 134 and 136) connected to the hub over a network, such as a private network established by the hub and connected to a telecommunications network, such as the network 110.

Figure 3:
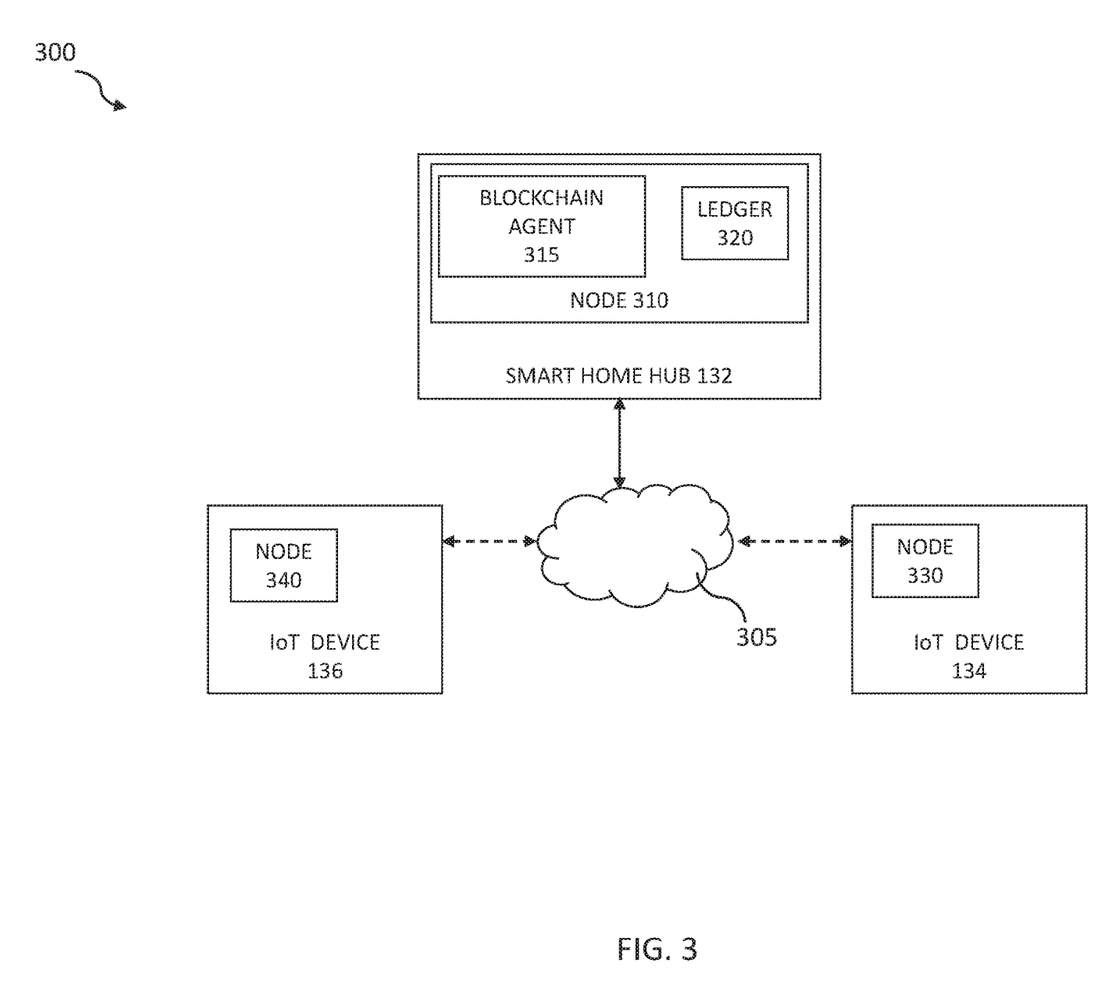
FIG. 3 is a block diagram illustrating a system for managing internet of things (IoT) devices connected to a hub using blockchain operations.

FIG. 3 is a block diagram 300 illustrating a system for managing internet of things (IoT) devices connected to a home automation hub using blockchain operations. The smart home hub 132 includes a node 310 of a blockchain network. The node 132 includes a blockchain agent 315 configured to perform blockchain transactions, operations, or other processes associated with a blockchain or ledger 320, which tracks and maintains a history of all transactions performed by the hub 132 and devices connected to the hub 132 over a network 305.

Further, any or all internet of things (IoT) devices, such as IoT device 134 and IoT device 136, can include a node, such as a node 330 of IoT device 134 and a node 340 of IoT device 136. Example IoT devices include energy monitoring devices, smart thermostats (and associated heating/cooling systems), wireless speakers and entertainment components, light switches and light bulbs, garage door openers, smart speakers and voice-controlled devices (e.g., Amazon Echo, Google Home, and so on), security cameras, smart doorbells, smart plugs, appliances, and so on.

The nodes 330, 340 can be similar to node 310, and include a blockchain agent configured to perform various blockchain processes, as well as store or maintain some or all aspects of the ledger 320 associated with the network 305. In some embodiments, the nodes 310, 330, and/or 340 are implemented into the devices 134, 136 as JavaScript modules (e.g., "Node.js"), or other similar modules (e.g., Solidity) and the ledger 320 or blockchain is configured as JavaScript array.

The nodes 330, 340 can also send requests to the node 310, such as requests to connect to the hub 132 or otherwise access services provided by the hub 132. For example, the nodes 330, 340 can send information that includes credentials for the IoT devices 134, 136, such as root certificate information, private key hashes (when the hub utilizes a public key cryptography system for providing secure communication with devices), smart contract information (e.g., information that identifies services to be provided to an IoT device by the hub 132), and so on.

Figure 4:
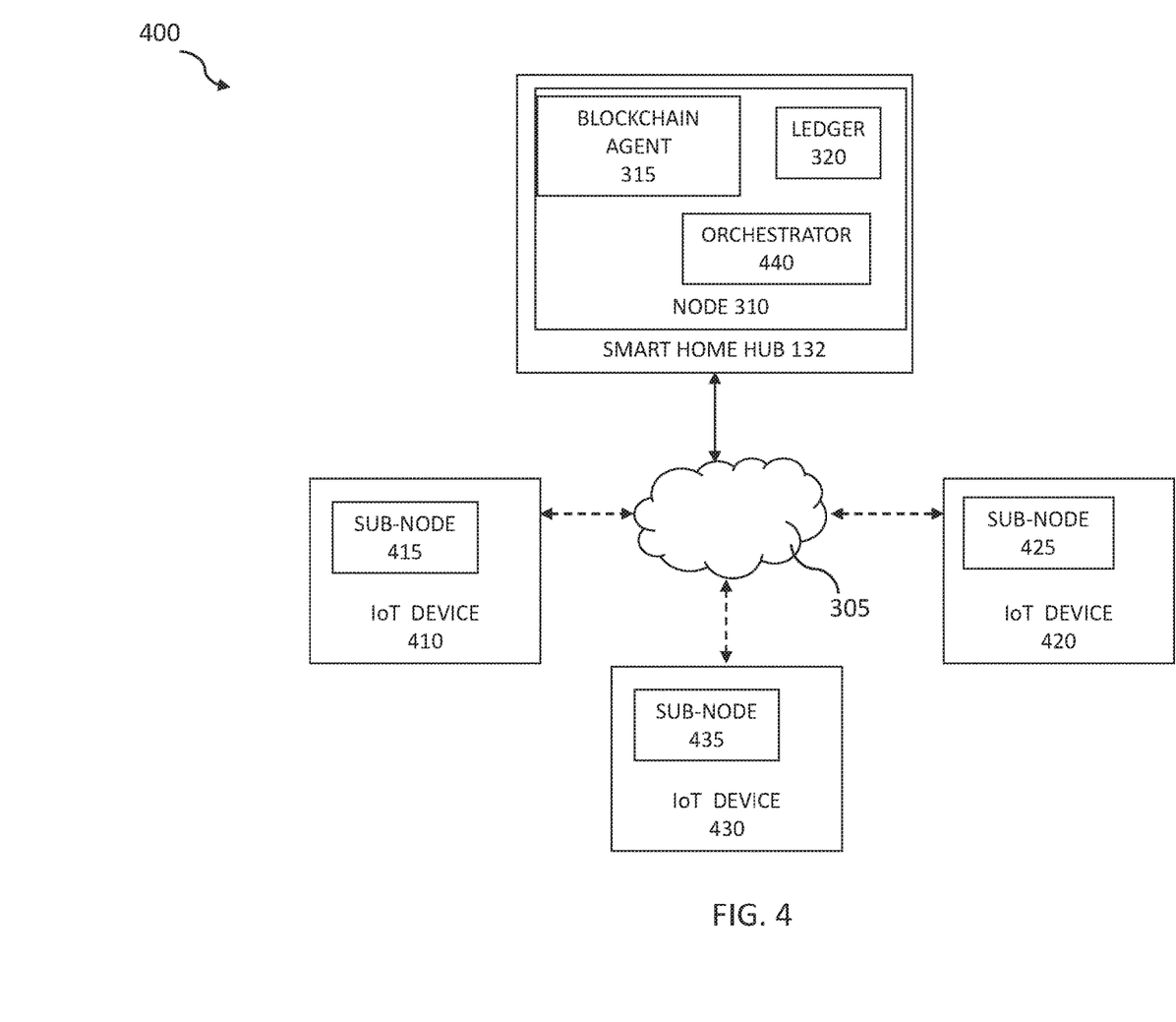
FIG. 4 is a block diagram illustrating a system for managing internet of things (IoT) devices by aggregating IoT devices as sub-nodes of a blockchain network.

In some embodiments, the IoT devices can include sub-nodes or other modules capable of managing, accessing, or downloading portions of the blockchain or ledger 320. FIG. 4 is a block diagram illustrating a system 400 for managing internet of things (IoT) devices by aggregating IoT devices as sub-nodes of a blockchain network.

A group of IoT devices, such as IoT devices 410, 420, 430, include sub-nodes 415, 425, 435, respectively. The sub-nodes include can features of the nodes, although can be limited in accessing an entire ledger 320 or blockchain.

Instead, the system 400 can aggregate the sub-nodes as one node, and, via an orchestrator 440 associated with the node 310 of the hub 132, perform coordinated operations as a single node across the three sub-nodes 415, 425, 435. Thus, for devices having limited processing, memory, or power capabilities, aggregating similar devices to perform some blockchain processes enables these devices to access the blockchain and operate as part of the distributed ledger 320.

Thus, in some embodiments, the systems configure a home automation hub (or any device acting as a hub of multiple devices, such as IoT devices) with a blockchain node. In addition, the devices that connect to the hub also include a blockchain node (or, sub-nodes in some cases). Via the nodes, the hub and the devices maintain a blockchain or distributed ledger of transactions for the network (e.g., the network 305), and utilize the blockchain to verify devices that attempt to connect to the network (e.g., new devices), re-verify devices already connected to the network (e.g., devices known to the network), and so on.

Figure 5:
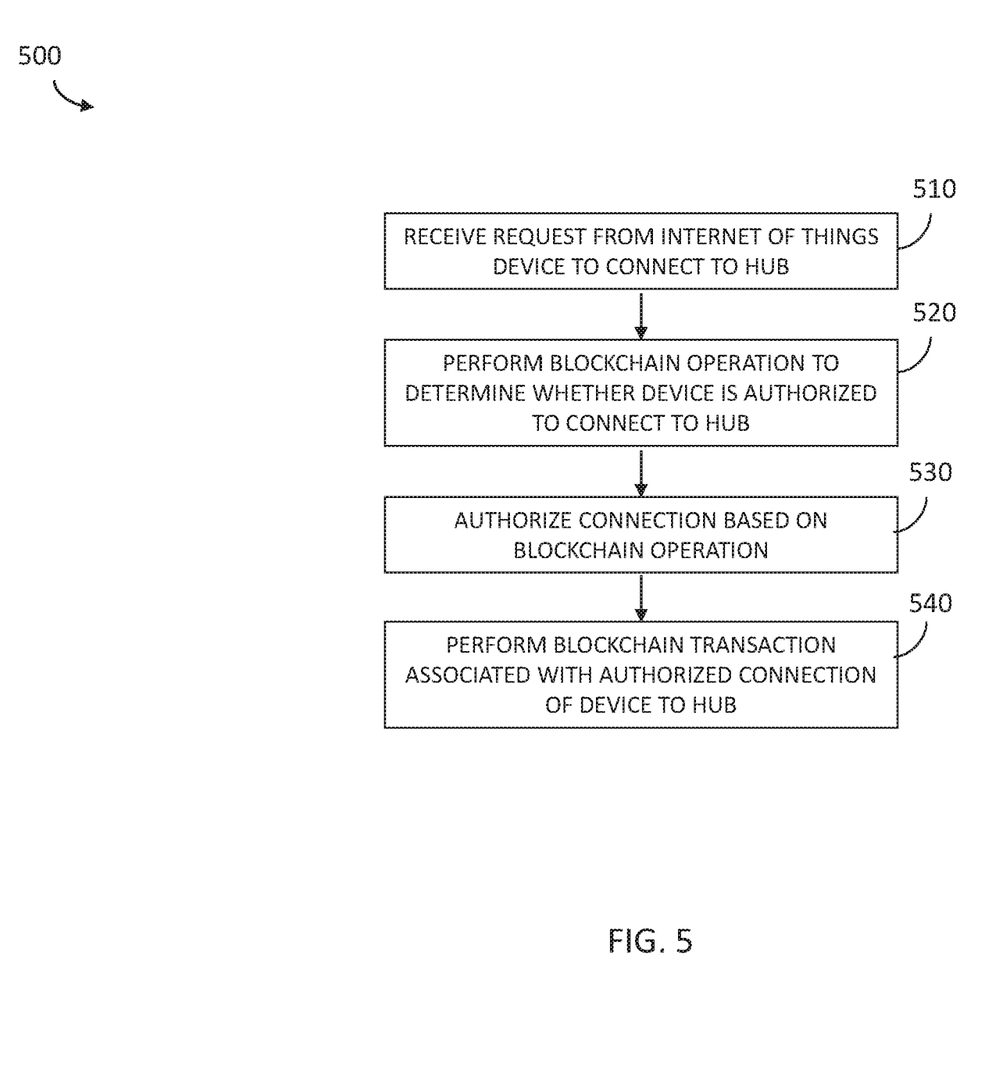
FIG. 5 is a flow diagram illustrating a method for verifying an internet of things (IoT) device to a hub over a network.

The nodes 310, 330, 340 (and sub-nodes 415, 425, 435), therefore, can perform various processes on behalf of the network 305, in order to maintain the network as a secure network for connected devices. FIG. 5 is a flow diagram illustrating a method 500 for verifying an internet of things (IoT) device to a hub over a network. The method 500 can be performed by the node 310 of the hub 132, and, accordingly, is described herein merely by way of reference thereto. It will be appreciated that the method 500 can be performed on any suitable hardware.

In operation 510, the node 310 receives, at a home automation hub that provides a network to multiple internet of things (IoT) devices, a request from an unknown IoT device to connect to the home automation hub. For example, the node 310 can receive a request from node 330 of IoT device 134 to connect to the home automation hub 132.

As described herein, the request can include various types of information that identify the device, the services requested by the device, and so on. For example, the request can include a root certificate or other public key certificate, private key information, smart contract information (e.g., agreement or relationship information between the device and the hub that identifies services authorized to provide to the device), or other digital certification or verification information. As another example, the request can simply include information identifying the IoT device (e.g., identification information following a naming or registration policy adopted by the hub).

In some cases, the unknown IoT device is a device that has never previously connected to the home automation hub. In other cases, the unknown device has previously connected to the home automation hub but has not been re-authorized by the home automation hub within a certain time period set forth by a security policy applied to connecting IoT devices to the home automation hub. Thus, devices can be considered "unknown" until they are re-verified by the node 310, in order to prevent known or seemingly secure devices previous verified from being compromised and exploiting the network 305, among other benefits.

In operation 520, the node 310 performs a blockchain operation to determine whether the IoT device is to be connected to the home automation hub. For example, the blockchain agent 315 accesses the ledger 320 to compare or match the information provided in the request (e.g., root certificate, identity information, and so on), to information associated with previous transactions (e.g., previous connections or requests to connect) for the network 305.

In some cases, the comparison can identify multiple different transactions associated with a device. For example, when the IoT device 134 requests to connect to the hub 132, the hub 132 can have previously allowed access on many previous occasions. The comparison, therefore, can associate the IoT device 134 as a trusted or likely reliable device based on the multiple positive previous connections (and uses).

However, in some cases, when an unknown device requests to connect to the hub 132, the node 310 may not be able to match the credentials associated with the device to any previous transactions. In such cases, the node 310 can identify transactions having other information (e.g., location, user input credentials, private key or registration information).

In operation 530, the node 310 determines, based on an outcome of the blockchain operation, whether to allow the request from the unknown IoT device to connect to the home automation hub. For example, the node 310 can determine the IoT device is associated with previous positive transactions tracked by the ledger 320 and allow the device with access to the hub 132.

For example, the node 310 can receive within the request a root certificate provided by the unknown IoT device, identify the root certificate in one or more previous blockchain transactions performed by the home automation hub 132, and allow the request from the unknown IoT device to connect to the home automation hub based on the identification. The node 310 can allow the IoT device to connect to the home automation hub and access services associated with the one or more access privileges provided by the home automation hub and defined by a smart contract object associated with the IoT device.

However, as another example, the node 310 may not identify any associations with information stored on the blockchain and deny the request (or provide the device with limited services pending further verification). For example, the node 310 can allow the device to access the network 305 and send data to the hub 132 but can prevent access to any data stored by the hub 132 or prevent the device from receiving any data over the network 305.

In operation 540, the node 310 performs a blockchain transaction associated with authorizing the unknown IoT device to connect to the hub. For example, the node 310 can perform a transaction that includes a hash of a previous block in the blockchain, a timestamp for the transaction, and transaction data that identifies the IoT device has been authorized to connect to the home automation hub.

Thus, the ledger 320 can include transactions that represent a variety of different activities performed between devices on the network 305. These transactions, or blocks, can record connection requests to the hub, connection authorizations, data transmitted between the hub and various devices, operations performed by the devices over the network 305 (e.g., a smart thermostat adjusting the temperature or a smart switch dimming a light), and other activities or operations.

In some embodiments, in addition to utilizing the blockchain to verify and/or validate devices to the hub 132, the node 310 can also enable the device to perform certain actions after the devices are dynamically or in real-time verified by the node 310. For example, an IoT device (e.g., a security alarm) may not be rearmed until it's root certificate is matched against the blockchain.

In some embodiments, the IoT device can be associated with a guest user, such as a device for a guest to a home or company. In such cases, the hub 132 can allow the IoT device temporal or limited access based on information provided by the device, once the node 310 verifies that the device 310 is not associated with any negative or nefarious activities.

The systems described herein, therefore, can enable a home automation hub, such as the smart home hub 132, or other hubs providing a network to multiple related devices, to securely communicate with the devices. Some example implementations are as follows:

Onboarding of new devices to the hub, where the hub utilizes the blockchain technology to initially validate a device to access the hub and be managed by the hub. For example, the systems can provision a new smart thermostat to the hub 132 by confirming the thermostat is the correctly registered thermostat using the blockchain;

Re-validating known devices to the hub, where the hub utilizes the blockchain technology to periodically (e.g., following a policy) or after certain events (e.g., after a potential security breach) re-validate devices connected to the hub, in order to verify that the devices are not compromised and controlled by outside actors. For example, upon receiving a request by a smart lock to unlock and open the back door (at a time when the door is normally not opened), the node 310 can verify the smart lock before allowing the smart lock to operate to unlock the door (or, in some cases, can revoke permission of the smart lock to be connected to the hub);

Provisioning a hub or IoT device with a node to facilitate the provisioning of the IoT device in routing data via the local network or to other network locations (e.g. cloud storage or other networked sites). For example, an IoT device can include a node that runs a smart contract to initiate various data provisioning protocols when the IoT device connects to a hub;

Utilizing smart contract aspects of the blockchain can block or prevent use of certain protocols when IoT devices communicate with the hub. For example, the node 310 of the home automation hub 132 can establish a smart contract (e.g., a collection of rights) that manages what communication protocols (e.g., ZigBee, Z-Wave, and so on), are permitted and/or blocked on the network; and so on.

Thus, in some embodiments, the systems provision a hub and devices managed by the hub over a network as nodes of a blockchain, and utilize the hub and devices in maintaining a blockchain for the network (or utilizing smart contracts), in order to improve and enhance the security of communications and control operations over the network, among other benefits.

CONCLUSION

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number can also include the plural or singular number respectively. The word "or," in reference to a list of two or more items, covers all of the following interpretations of the word: any of the items in the list, all of the items in the list, and any combination of the items in the list.

As used herein, being above a threshold means that a value for an item under comparison is above a specified other value, that an item under comparison is among a certain specified number of items with the largest value, or that an item under comparison has a value within a specified top percentage value. As used herein, being below a threshold means that a value for an item under comparison is below a specified other value, that an item under comparison is among a certain specified number of items with the smallest value, or that an item under comparison has a value within a specified bottom percentage value. As used herein, being within a threshold means that a value for an item under comparison is between two specified other values, that an item under comparison is among a middle specified number of items, or that an item under comparison has a value within a middle specified percentage range.

The above Detailed Description of examples of the technology is not intended to be exhaustive or to limit the technology to the precise form disclosed above. While specific examples for the technology are described above for illustrative purposes, various equivalent modifications are possible within the scope of the technology. For example, while processes or blocks are presented in a given order, alternative implementations can perform routines having steps, or employ systems having blocks, in a different order, and some processes or blocks can be deleted, moved, added, subdivided, combined, and/or modified to provide alternative or subcombinations. Each of these processes or blocks can be implemented in a variety of different ways. Also, while processes or blocks are at times shown as being performed in series, these processes or blocks can instead be performed or implemented in parallel, or can be performed at different times. Further any specific numbers noted herein are only examples: alternative implementations can employ differing values or ranges.

The teachings of the technology provided herein can be applied to other systems, not necessarily the system described above. The elements and acts of the various examples described above can be combined to provide further implementations of the technology. Some alternative implementations of the technology can include not only additional elements to those implementations noted above, but also can include fewer elements.

These and other changes can be made to the technology in light of the above Detailed Description. While the above description describes certain examples of the technology, and describes the best mode contemplated, no matter how detailed the above appears in text, the technology can be practiced in many ways. Details of the system can vary considerably in its specific implementation, while still being encompassed by the technology disclosed herein. As noted above, particular terminology used when describing certain features or aspects of the technology should not be taken to imply that the terminology is being redefined herein to be restricted to any specific characteristics, features, or aspects of the technology with which that terminology is associated. In general, the terms used in the following claims should not be construed to limit the technology to the specific examples disclosed in the specification, unless the above Detailed Description section explicitly defines such terms. Accordingly, the actual scope of the technology encompasses not only the disclosed examples, but also all equivalent ways of practicing or implementing the technology under the claims.

Certain aspects of the technology are presented below in certain claim forms to reduce the number of claims, but the applicant contemplates the various aspects of the technology in any number of claim forms. For example, while only one aspect of the technology is recited as a computer-readable medium claim, other aspects can likewise be embodied as a computer-readable medium claim, or in other forms, such as being embodied in a means-plus-function claim. Any claims intended to be treated under 35 U.S.C. § 112(f) will begin with the words "means for", but use of the term "for" in any other context is not intended to invoke treatment under 35 U.S.C. § 112(f). Accordingly, the applicant reserves the right to pursue additional claims after filing this application to pursue such additional claim forms, in either this application or in a continuing application.

What is claimed is:

1. A non-transitory computer-readable medium whose contents, when executed by a computing system associated with a network, causes the computing system to perform a method, the method comprising:
   receiving, at a home automation hub, a request from an unknown IoT device to connect to the home automation hub,
      wherein the home automation hub provides a network to multiple internet of things (IoT) devices within a room or building;
   performing, by the home automation hub, a blockchain operation to determine whether the IoT device is to be connected to the home automation hub,
      wherein the blockchain operation is performed by a software agent of the home automation hub,
      wherein the agent is configured to operate as a node of a blockchain, and
      wherein the blockchain tracks transactions associated with the network and is managed by the network; and
   determining, based on an outcome of the blockchain operation, whether to allow the request from the unknown IoT device to connect to the home automation hub,
      wherein determining whether to allow the request from the unknown IoT device to connect to the home automation hub comprises:
         receiving within the request a root certificate provided by the unknown IoT device:
         identifying the root certificate in one or more previous blockchain transactions managed by the blockchain; and
         allowing the request from the unknown IoT device to connect to the home automation hub based on the identification.

2. The non-transitory computer-readable medium of claim 1, wherein determining whether to allow the request from the unknown IoT device to connect to the home automation hub includes:
   identifying within the request a smart contract object that defines one or more access privileges for the IoT device with respect to services provided by the home automation hub; and
   allowing the IoT device to connect to the home automation hub and access services associated with the defined one or more access privileges provided by the home automation hub.

3. The non-transitory computer-readable medium of claim 1, wherein determining, based on an outcome of the blockchain operation, whether to allow the request from the unknown IoT device to connect to the home automation hub includes:
   determining that the request includes a private key that verifies the unknown IoT device is an authorized device to be connected to the home automation hub under a public cryptography system established by the home automation hub.

4. The non-transitory computer-readable medium of claim 1, wherein the unknown IoT device has never previously connected to the home automation hub.

5. The non-transitory computer-readable medium of claim 1, wherein the unknown IoT device has previously connected to the home automation hub but has not been re-authorized by the home automation hub within a certain time period set forth by a security policy applied to connecting IoT devices to the home automation hub.

6. The non-transitory computer-readable medium of claim 1, wherein the home automation hub includes a Javascript script that acts as the agent of the home automation hub configured to operate as the node associated with the blockchain.

7. The non-transitory computer-readable medium of claim 1, wherein a Javascript script of the unknown IoT device and associated with the blockchain transmits the request to connect to the home automation hub; and
   wherein the JavaScript script performs a transaction on the blockchain network associated with the request to connect to the home automation hub.

8. The non-transitory computer-readable medium of claim 1, wherein the unknown IoT device is a smart home device.

9. The non-transitory computer-readable medium of claim 1, further comprising:
   performing a transaction to the blockchain that includes a hash of a previous block in the blockchain, a timestamp for the transaction, and transaction data that identifies the IoT device has been authorized to connect to the home automation hub.

10. A method, comprising:
    receiving, at a home automation hub that provides a network to multiple internet of things (IoT) devices, a request from an unknown IoT device to connect to the home automation hub;
    performing, by the home automation hub, a blockchain operation to determine whether the IoT device is to be connected to the home automation hub,
       wherein the blockchain operation is performed by an agent of the home automation hub that is configured to operate as a node of a blockchain that tracks transactions associated with the network; and
    determining, based on an outcome of the blockchain operation, whether to allow the request from the unknown IoT device to connect to the home automation hub,
       wherein the unknown IoT device has previously connected to the home automation hub but has not been re-authorized by the home automation hub within a certain time period set forth by policy applied to connecting IoT devices to the home automation hub.

11. The method of claim 10, wherein determining whether to allow the request from the unknown IoT device to connect to the home automation hub includes:
    identifying within the request a smart contract object that defines one or more access privileges for the IoT device with respect to services provided by the home automation hub; and allowing the IoT device to connect to the home automation hub and access services associated with the defined one or more access privileges provided by the home automation hub.

12. The method of claim 10, wherein determining whether to allow the request from the unknown IoT device to connect to the home automation hub includes:
   receiving within the request a root certificate provided by the unknown IoT device;
   identifying the root certificate in one or more previous blockchain transactions managed by the blockchain; and
   allowing the request from the unknown IoT device to connect to the home automation hub based on the identification.

13. The method of claim 10, wherein determining, based on an outcome of the blockchain operation, whether to allow the request from the unknown IoT device to connect to the home automation hub includes:
   determining that the request includes a private key that verifies the unknown IoT device is an authorized device to be connected to the home automation hub under a public cryptography system established by the home automation hub.

14. The method of claim 10, wherein the unknown IoT device has never previously connected to the home automation hub.

15. The method of claim 10, wherein the home automation hub includes a Javascript script that acts as the agent of the home automation hub configured to operate as the node associated with the blockchain.

16. The method of claim 10, wherein determining, based on an outcome of the blockchain operation, whether to allow the request from the unknown IoT device to connect to the home automation hub includes determining that the IoT device can operate over the network to receive data from the home automation hub.

17. A system associated with a home automation hub that provides a network to one or more internet of things (IoT) devices, the system comprising:
   at least one hardware processor;
   at least one non-transitory memory, coupled to the at least one hardware processor and storing instructions, which when executed by the at least one hardware processor, perform a process, the process comprising:
      receiving, at the home automation hub, a request from an unknown IoT device to connect to the home automation hub,
         wherein the home automation hub provides a network to multiple internet of things (IoT) devices within a room or building;
      performing, by the home automation hub, a blockchain operation to determine whether the IoT device is to be connected to the home automation hub,
         wherein the blockchain operation is performed by a software agent of the home automation hub,
         wherein the agent is configured to operate as a node of a blockchain, and
         wherein the blockchain tracks transactions associated with the network and is managed by the network; and
      determining, based on an outcome of the blockchain operation, whether to allow the request from the unknown IoT device to connect to the home automation hub,
         wherein determining, based on an outcome of the blockchain operation, whether to allow the request from the unknown IoT device to connect to the home automation hub comprises determining that the IoT device can operate over the network to receive data from the home automation hub.

18. The system of claim 17, wherein the software agent is implemented as a Node.js object of the home automation hub, and wherein the IoT device includes Node.js objects that transmit messages from the IoT device to the Node.js object.

19. The system of claim 17, wherein determining, based on an outcome of the blockchain operation, whether to allow the request from the unknown IoT device to connect to the home automation hub comprises:
   determining that the request includes a private key that verifies the unknown IoT device is an authorized device to be connected to the home automation hub under a public cryptography system established by the home automation hub.

20. The system of claim 17, wherein the unknown IoT device has never previously connected to the home automation hub.

* * * * *